(12) United States Patent
Kaitani et al.

(10) Patent No.: US 7,791,911 B2
(45) Date of Patent: Sep. 7, 2010

(54) INVERTER DEVICE WHICH MAINTAINS VOLTAGE DURING INPUT VOLTAGE DROP

(75) Inventors: Toshiyuki Kaitani, Tokyo (JP); Satoshi Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 452 days.

(21) Appl. No.: 11/884,266

(22) PCT Filed: Dec. 15, 2006

(86) PCT No.: PCT/JP2006/325078
§ 371 (c)(1),
(2), (4) Date: Aug. 14, 2007

(87) PCT Pub. No.: WO2008/072348
PCT Pub. Date: Jun. 19, 2008

(65) Prior Publication Data
US 2009/0052209 A1 Feb. 26, 2009

(51) Int. Cl.
*H02M 5/45* (2006.01)
*H02M 5/458* (2006.01)
(52) U.S. Cl. .................................. 363/37; 307/66
(58) Field of Classification Search .............. 363/34, 363/35, 37; 307/64, 66
See application file for complete search history.

(56) References Cited

U.S. PATENT DOCUMENTS
4,459,534 A * 7/1984 Nagase et al. ............... 318/808

(Continued)

FOREIGN PATENT DOCUMENTS

JP    60-43084 A    3/1985

(Continued)

OTHER PUBLICATIONS

Machine translation of JP-10-164883.*
Wook-Jin Lee et al, "A Protection of the Electrolytic Capacitor-less Drive System against the Input Grid Interruption", IEEE, Oct. 2006, pp. 2454-2458.

(Continued)

*Primary Examiner*—Henry Behm
*Assistant Examiner*—Matthew Grubb
(74) *Attorney, Agent, or Firm*—Sughrue Mion, PLLC

(57) ABSTRACT

An inverter device includes a converter circuit that rectifies a first alternating current output from a power supply to generate a rectified current, a capacitor that stores therein the rectified current and outputs a direct current based on the rectified current, and an inverter circuit that converts the direct current into a second alternating current for driving a load. Moreover, a voltage control unit generates and outputs, during a period when any one of an instantaneous power cut and an instantaneous voltage drop occurs in the power supply, a first current command based on a voltage of the capacitor and a second current command; and a current control unit generates and outputs, based on the first current command, the second current command for controlling the inverter circuit to output the second alternating current.

4 Claims, 6 Drawing Sheets

U.S. PATENT DOCUMENTS

| | | | |
|---|---|---|---|
| 6,094,364 A | * | 7/2000 | Heikkila ................. 363/41 |
| 6,741,482 B2 | * | 5/2004 | Yamamoto et al. ........... 363/37 |
| 2006/0044848 A1 | * | 3/2006 | Suzuki et al. ................. 363/37 |

FOREIGN PATENT DOCUMENTS

| | | |
|---|---|---|
| JP | 4-317592 A | 11/1992 |
| JP | 7-177783 A | 4/1995 |
| JP | 10-66385 A | 3/1998 |
| JP | 10-164883 A | 6/1998 |

OTHER PUBLICATIONS

Kai Pietilainen et al, "DC-Link Stabilization and Voltage Sag Ride-through of Inverter Drives", IEEE Transactions on Industrial Electronics, Bo. 53, No. 4, Aug. 2006, pp. 1261-1268.

S.D. Sudhoff, et al, "DC Link Stabilized Field Oriented Control of Electric Propulsion Systems", IEEE Transactions on Energy Conversion, vol. 13, No. 1, Mar. 1998, pp. 27-33.

"DC-Link Voltage Stabilization for Motor Drive Inverter System with Reduced Capacitance", Seoul National University Library, Feb. 2009.

* cited by examiner

US 7,791,911 B2

INVERTER DEVICE WHICH MAINTAINS VOLTAGE DURING INPUT VOLTAGE DROP

TECHNICAL FIELD

The present invention relates to an inverter device. More specifically, the present invention relates to an inverter device that is able to continue, without stopping, driving a load even if instantaneous power cut or an instantaneous voltage drop (hereinafter, collectively referred to as "instantaneous voltage drop") occurs in a system power supply.

BACKGROUND ART

For example, Patent document 1 discloses an inverter device (inverter controller) that is able to continue conversion of electric power for transmitting to a load even if an instantaneous voltage drop occurs in the electric power system. In the conventional technology disclosed in Patent Document 1, when an instantaneous voltage drop occurs in the electric power system, the direct-current-bus voltage and the current input to the inverter device are detected and a feedback control is performed such that the direct-current-bus voltage of the inverter device attains a certain desired voltage based on the detected direct-current-bus voltage and the detected input current. In addition, the output frequency of the inverter device is adjusted such that the input current meets a controller output of the direct-current-bus voltage. Accordingly, the inverter device is able to continue driving a load without stopping even if an instantaneous voltage drop occurs.

Patent Document 1: Japanese Patent Application Laid-open No. H4-317592

DISCLOSURE OF INVENTION

Problem to be Solved by the Invention

In the conventional technology represented by Patent Document 1, however, an output voltage is not adjusted while the output frequency of the inverter device is adjusted based on the controller output of the direct-current-bus voltage. In the conventional technology, phase adjustment of the output voltage of the inverter device is carried out only once upon occurrence of an instantaneous voltage drop. After the phase adjustment, only the output frequency of the inverter device is controlled. For this reason, the problem has been whether the direct-current-bus voltage or the inverter input current can meet each command value.

The present invention was made in view of the above problem. An object of the present invention is to provide an inverter device that is able to reliably continue driving a load even if an instantaneous voltage drop occurs in a system power supply.

Means for Solving Problem

To solve the above problems and to achieve the objects, an inverter device according to an aspect of the present invention includes a converter circuit that rectifies an alternating-current output from an alternating-current power supply to generate a rectified current; a capacitor that stores therein the rectified current output from the converter circuit; an inverter circuit that converts a direct-current output from the capacitor into a certain alternating-current output and outputs the certain alternating-current output; a voltage control unit that controls a voltage of the capacitor at a certain value; and a current control unit that generates, based on a current command that is output from the voltage control unit, an output command for controlling a current that is output from the inverter circuit, and outputs the output command being to be output to the inverter circuit, wherein the voltage control unit generates the current command based on information on the voltage of the capacitor and the output command to be output to the inverter circuit, during a period when any one of instantaneous power cut and an instantaneous voltage drop occurs in the alternating-current power supply.

Effect of the Invention

According to an aspect of the present invention, in an inverter device, a current command to be output to a current control system is generated based on information on a voltage of a smoothing capacitor and an output command to be output to an inverter main circuit during a period when instantaneous power cut or an instantaneous voltage drop occurs in a system power supply. Such generation of a current command leads to an effect that driving a load can be continued securely even if an instantaneous voltage drop occurs in the system power supply.

BRIEF DESCRIPTION OF DRAWINGS

FIG. 6-1 is a schematic diagram of a configuration of a driving unit in an inverter main circuit of an inverter device according to a third embodiment.

FIG. 6-2 is a schematic diagram of a configuration of a relevant part of a feedback control system of the inverter device according to the third embodiment.

FIG. 6-3 is a schematic diagram of a configuration of a voltage control system that constitutes a part of the feedback control system of the inverter device according to the third embodiment.

EXPLANATIONS OF LETTERS OR NUMERALS

Figure 1:
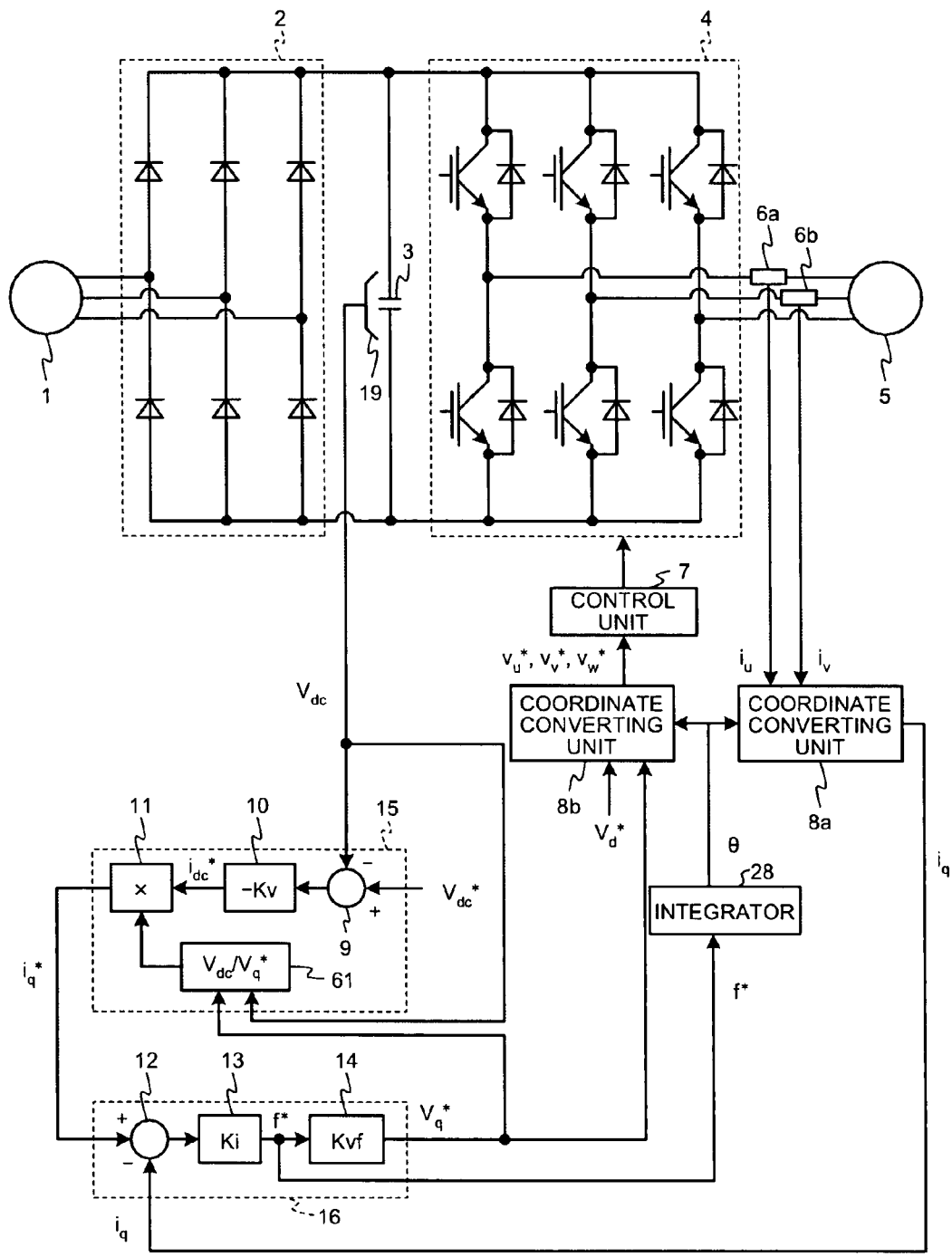
FIG. 1 is a schematic diagram of a configuration of an inverter device according to a first embodiment of the present invention.

1 System power supply
2 Diode converter
3 Smoothing capacitor
4 Inverter main circuit
5 Motor
6a, 6b Current detector
7 Control unit
8a, 8b, 33a, 33b Coordinate converting unit
9, 12, 24, 34, 38 Subtractor
10 Voltage controller
11, 29, 70 Multiplier
28, 41, 43, 72 Integrator
61, 62 Computing unit
13 Current controller
14 Coefficient multiplier 15, 25 Voltage control system
16, 31 Current control system
19 Voltage detector
30 Rotation speed detector
32 Slip controller
35 d-axis current control unit
36, 40, 41, 74 Adder
39 q-axis current control unit
42 voltage canceling unit

BEST MODE(S) FOR CARRYING OUT THE INVENTION

Exemplary embodiments of inverter devices of the present invention are explained in detail below with reference to the accompanying drawings. Note that the present invention is not limited to the embodiments.

First Embodiment

FIG. 1 is a schematic diagram of a configuration of an inverter device according to a first embodiment of the present invention. The inverter device according to the first embodiment shown in FIG. 1 has an input terminal and an output terminal. A system power supply 1 is connected to the input terminal and a motor 5 as a load is connected to the output terminal. Driving of the motor 5 is controlled by a diode converter 2, a smoothing capacitor 3, an inverter main circuit 4, current detectors 6a and 6b, a voltage detector 19, and a feedback control system that operates based on detection results of the current detectors 6a and 6b and the voltage detector 19. The feedback control system includes a voltage control system 15, a current control system 16, an integrator 28, coordinate converting units 8a and 8b, and a control unit 7. In this configuration, the inverter main circuit 4 is controlled with the output of the control unit 7.

(Functions of Elements of Inverter Device)

Subsequently, functions of the elements of the inverter device are explained below.

The diode converter 2, as shown in FIG. 1, includes six diodes that constitute a full-bridge circuit. The diode converter 2 converts a three-phase alternating-current output from the system power supply 1 into a direct current. The smoothing capacitor 3 stores therein the direct current output from the diode converter 2. The inverter main circuit 4 includes a plurality of circuit units (switching units), each of which includes a switching element and a diode. The switching element and the diode are connected in reverse-parallel to each other. The circuit units are arranged in an upper stage and a lower stage. A switching unit in the upper stage and a switching unit in the lower stage constitute a pair and they are connected in series. Each pair of the switching units is connected in parallel to an adjoining pair. The inverter main circuit 4 includes three pairs of switching units for three-phase operation thus forming a bridge circuit. The inverter main circuit 4 converts the direct current stored in the smoothing capacitor 3 into an alternating current. The voltage detector 19 monitors the voltage across the terminals of the smoothing capacitor 3 as appropriate. Each of the current detectors 6a and 6b monitors a load current (phase current) based on currents output from the inverter main circuit 4 (hereinafter, "inverter current output") as appropriate. No current detector has been shown in FIG. 1 for a W phase because the current from the W phase can be calculated by vector processing on detected currents of U and W phases.

The coordinate converting unit 8a performs processing for conversion of the inverter current output, which is in an UVW three-phase fixed coordinate system, into a value for a rotating coordinate system (orthogonal dq-double-axis rotating coordinate system). The rotating coordinate system rotates in synchronization with the output frequency of the inverter output. More specifically, based on a standard phase θ calculated by the integrator 28, which is described below, the coordinate converting unit 8a performs an arithmetic operation on the currents of the U, V, and W phases ($i_u$, $i_v$, and $i_w$) that are detected/calculated by the current detectors 6a and 6b thereby obtaining a q-axis current $i_q$ that translates to a torque of the motor 5. The coordinate converting unit 8a outputs the q-axis current $i_q$. The coordinate converting unit 8a can be configured to calculate a d-axis current $i_d$, which is a current component of a d axis that is delayed by 90 degrees from the q axis. However, because only the q-axis current $i_q$ is used in the first embodiment as descried below, it is not necessary to calculate the d-axis current in the first embodiment.

The voltage control system 15 includes a subtractor 9, a voltage controller 10 that is a proportional controller, a multiplier 11, and an operator 61. The voltage control system 15 generates a q-axis current command ($i_q$*) based on the voltage ($V_{dc}$) across the terminals of the smoothing capacitor 3 that is detected by the voltage detector 19, a target voltage ($V_{dc}$*) of the smoothing capacitor 3 that is necessary to continue to drive the motor 5, and the output of the current control system 16 that is described below. The voltage controller 10 can be configured with a proportional-integral controller.

The current control system 16 includes a subtractor 12, a current controller 13 that is a proportional controller, and a coefficient multiplier 14. The current control system 16 generates a q-axis voltage command (Vq*) based on a control output (q-axis current command: iq*) of the voltage control system 15, and an output (q-axis current: iq) of the coordinate converting unit 8a. The current controller 13 can be configured with a proportional-integral controller.

The coordinate converting unit 8b performs processing for converting a value in the orthogonal dp-double-axis rotating coordinate system into a value in the UVW three-phase fixed coordinate system. More specifically, based on the standard phase θ output from the integrator 28, the coordinate converting unit 8b generates command values (inverter output-voltage commands: $v_u$*, $v_v$*, and $v_w$*) of output voltage of the inverter based on the control output (the q-axis voltage command: $V_q$*) of the current control system 16 and a pre-defined d-axis voltage command ($V_d$*). As described below, in the first embodiment, the inverter output-voltage commands ($v_u$*, $v_v$*, and $v_w$*) for the motor 5 are generated from only the q-axis voltage command $V_q$* (in other words, the d-axis voltage command $V_d$* is set to zero).

Based on the inverter output-voltage commands ($v_u$*, $v_v$*, and $v_w$*) the control unit 7 generates a control signal that causes the inverter output to have desired voltages, desired frequencies, and desired phases. The control unit 7 outputs the control signal to the inverter main circuit 4.

(Operations of Inverter Device)

The operations of the inverter device according to the first embodiment are described below with reference to FIG. 1.

The current output from the system power supply 1 is stored in the smoothing capacitor 3 via the diode converter 2. When the system power supply 1 is operating normally, the current stored in the smoothing capacitor 3 is used to obtain a desired alternating-current voltage at the inverter main circuit 4 by using known techniques, and the alternating-current voltage is output to the motor 5.

If an instantaneous voltage drop occurs in the system power supply 1, on the other hand, the system power supply 1 and the smoothing capacitor 3 are electrically disconnected from each other because of the operation of the diode converter 2. In this state, typically, because the inverter main circuit 4 keeps on driving, the voltage of the smoothing capacitor 3 keeps on decreasing, and the inverter main circuit 4 stops once all the current is drawn from the smoothing capacitor 3.

In the first embodiment, however, the voltage detector 19 detects occurrence of the instantaneous voltage drop, and inputs the detected voltage $V_{dc}$ of the smoothing capacitor 3 to the voltage control system 15.

Subsequently, the subtractor 9 subtracts the detected voltage $V_{dc}$ input to the voltage control system 15 from the target voltage $V_{dc}*$. The subtraction result ($=V_{dc}*-V_{dc}$) obtained by the subtractor 9 is input to the voltage controller 10. The voltage controller 10 generates and outputs the current command $i_{dc}*$ that should flow through the smoothing capacitor 3. Meanwhile, the detected voltage $V_{dc}$ and the q-axis voltage command $V_q*$ output from the current control system 16 are input to the operator 61. The operator 61 performs an arithmetic operation to obtain "$V_{dc}/V_q*$". The multiplier 11 multiplies the current command $i_{dc}*$ and the result of the arithmetic operation $V_{dc}/V_q*$ output from the operator 61. The result of multiplication is output from the voltage control system 15. The current output from the voltage control system 15 is input as the q-axis current command $i_q*$ to the current control system 16 of the next phase.

The subtractor 12 performs subtraction processing to subtract the q-axis current $i_q$ from the q-axis current command $i_q*$ having input into the current control system 16. The result of subtraction ($=i_q*-i_q$) obtained by the subtractor 12 is input to the current controller 13, where it is converted into a frequency command f*. The frequency command f* is input to the coefficient multiplier 14 where it is transformed into the q-axis voltage command $V_q*$. The coefficient multiplier 14 is configured based on the relation between the output frequency and the output voltage of the inverter output. For example, if the known V/f control is employed, the coefficient of the coefficient multiplier 14 will be a constant value Kvf. For calculation of the q-axis current $i_q$, to be input to the subtractor 12, in the coordinate converting unit 8a requires phase information (reference phase θ). The phase information is calculated in the integrator 28 from the current output (frequency command f*) of the current controller 13. The operations executed thereafter are as described above, and thus, explanation thereof is omitted below.

Figure 2:
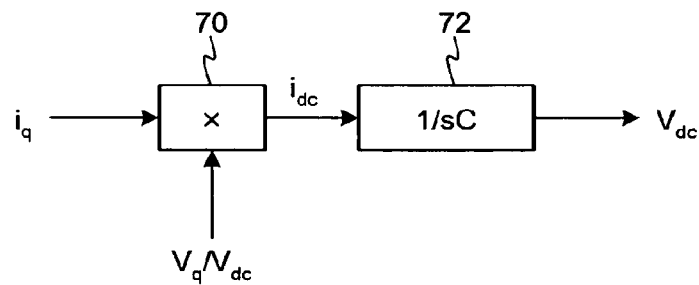
FIG. 2 is a schematic diagram of a basic configuration for determining a voltage control system according to the first embodiment.

In the first embodiment, in the voltage control system 15, the multiplier 11 is caused to perform multiplying processing to multiply "$V_{dc}/V_q*$" obtained by the operator 61 with the current command $i_{dc}*$ that should flow into the smoothing capacitor 3 to obtain the q-axis current command $i_q*$. The reason for employing such a configuration is descried below with reference to FIG. 2. FIG. 2 is a schematic diagram of the basic configuration for determining the configuration of the voltage control system according to the first embodiment.

A multiplier 70 and an integrator 72 are shown in FIG. 2 where "s" in the box of the integrator 72 represents the Laplace operator (s-function) and "C" represents the capacitance of the smoothing capacitor 3. Thus, the integrator 72 functions as an integrator.

The relation between the energy output from the smoothing capacitor 3 and the energy of the inverter output is explained below. First, the energy (electric power) output from the smoothing capacitor 3 is "$V_{dc} \times i_{dc}$". On the other hand, the energy (electric power) of the inverter output is "$V_d \times i_d + V_q \times i_q$". Because the inverter main circuit 4 itself has no energy source, the energy output from the smoothing capacitor 3 is equal to the energy of the inverter output.

Moreover, in the first embodiment, as described above, because $V_d*=0$ (in other words, $V_d=0$), the relation between $i_{dc}$ and $i_q$ can be represented by the following Equation:

$$i_{dc}=i_q \times V_q/V_{dc} \qquad (1)$$

The control system shown in FIG. 2 has been designed based on Equation (1) where $i_{dc}$ is calculated by multiplying $i_q$ with the coefficient "$V_q/V_{dc}$". The smoothing capacitor with the capacitance C is charged with $i_{dc}$, and thus, $V_{dc}$ is obtained as output of the smoothing capacitor.

The output of the voltage controller 10 is $i_{dc}*$. In the current controller, it is preferable that q-axis current component $i_q$ that directly relates to the torque amount be controlled. Hence, in the first embodiment, as described above, the configuration is adopted in which the operator 61 that performs an arithmetic operation to obtain "$V_{dc}/V_q*$" and the multiplier 11 that multiplies the output of the operator 61 by "$i_{dc}*$" are provided in the voltage control system 15 such that the q-axis current command $i_q$ is output from the voltage control system 15 to the current control system 16.

In other words, because Equation (1) can be changed to $i_q=i_{dc} \times V_{dc}/V_q$, the configuration has been adopted in which the multiplier 11 multiplies the output of the operator 61 that performs an arithmetic operation to obtain "$V_{dc}/V_q*$" with $i_{dc}$, which is input to the multiplier 11, to output the q-axis current command $i_q*$ to the current control system 16.

Figure 3:
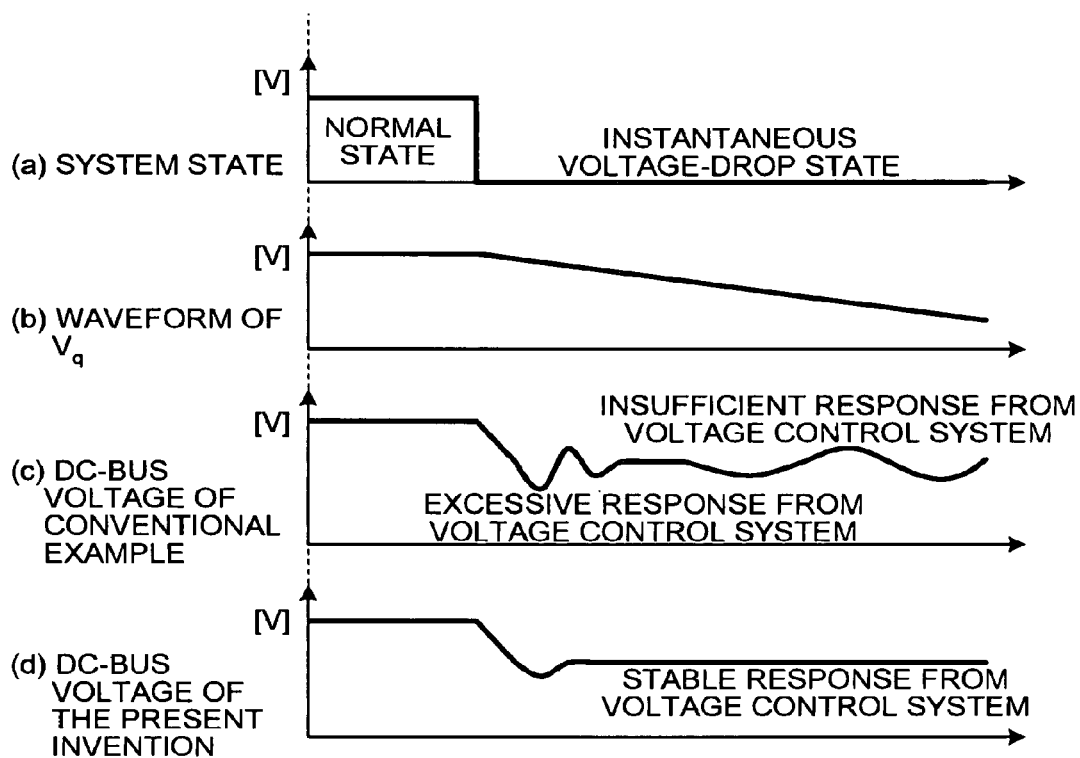
FIG. 3 is a graphical representation of a response state of voltage control systems of the first embodiment and the conventional technology for the purpose of comparison.

FIG. 3 is a graphical representation of a response state of voltage control systems of the first embodiment and the conventional technology for the purpose of comparison. The topmost graph (a) in FIG. 3 represents a state of the system, the graph (b) below the graph (a) represents a waveform of $V_q$, the graph (c) below the graph (b) represents the direct-urrent-bus voltage according to a conventional example, and the lowermost graph (d) represents the direct-current-bus voltage according to the present invention. At the time point when the system state changes from a normal state to an instantaneous voltage-drop state (graph (a)), for example, the q-axis voltage component $V_q$ starts decreasing (graph (b)) as a result of the decrease in the number of rotations of the motor, which is a load, due to instantaneous voltage-drop.

In such a case, in the conventional technology, the control by the voltage control system is performed only for certain amplification. As a result, the response of the voltage control system changes along with the change of the value of $V_q$. Accordingly, sometimes the response becomes excessive and sometimes becomes insufficient depending on the value of $V_q$, causing the direct-current-bus voltage to be irregular as seen from the graph (c) in FIG. 3.

On the other hand, in the first embodiment, the multiplier 11 performs control in which the term $V_q*$ is previously reflected. Accordingly, the response of the voltage control system does not become unstable irrespective of the value of $V_q$, so that the response of the voltage control system becomes stable as seen from the graph (d) in FIG. 3. In this manner, the inverter input current is easy to meet a controller output of the direct-current-bus voltage.

In the first embodiment, a configuration has been employed in which the current that flows into the motor 5 is detected. Alternatively, the current to be input to the inverter main circuit 4 or the current flowing through each arm of the inverter main circuit 4 can be detected. The detection of the current that flows into the motor 5 is advantageous in various respect as explained below.

The current to be input to the inverter main circuit 4 typically flows contiguously with a rectangular waveform resulting from pulse width modulation. To obtain any significant information from such a current, the current must be filtered by using, for example, a low pass filter. The necessity of such filtering degrades the response of the current control system. Moreover, the line impedance between the inverter main circuit 4 and the smoothing capacitor 3 increases due to provision of a current detector for measuring an input current, resulting in a drawback that the surge voltage increases due to the operation of switching units that constitute the inverter main circuit 4.

On the contrary, in the first embodiment, there is no need perform filtering with respect to the current that is detected, i.e., the current that flows into the motor 5, because the current has a pseudo sine waveform. Accordingly, the inverter device can be configured with simple configuration. In addition, because the circuit line between the inverter main circuit 4 and the smoothing capacitor 3 can shortened, an effect can be obtained as well that a large surge voltage is not generated.

As described above, in the first embodiment, the q-axis current command $i_q^*$ that is required for the current control system is obtained as follows. That is, a certain multiplying processing is performed on the current command $i_{dc}^*$ to be output to the smoothing capacitor thereby surely obtaining the current $i_{dc}$ of the smoothing capacitor, which is required for the voltage control system, to obtain the $V_{dc}$ that is stable at a desired value. Hence, even if an instantaneous voltage drop occurs in a system power supply, the driving of the inverter device can be continued stably.

Moreover, even if the rotation speed of the motor 5 decreases due to the load connected to the motor 5, the inverter main circuit 4 is controlled such that the voltage of the smoothing capacitor 3 is maintained at a certain value. As a result, the number of rotations of the motor 5 and the output frequency of the inverter main circuit 4 are controlled in such a manner that the number of rotations and output frequency of the motor 5 are maintained "almost" constant. "Almost" is used here because there may be smaller fluctuations because of the loss due to conversion in the inverter main circuit 4 and the loss in the motor 5. Along with the deceleration of the motor 5, the output frequency and the output voltage $V_q$ of the inverter main circuit 4 decrease. However, because the multiplier 11 of the voltage control system 15 takes the term $V_q$ into account, the response of the voltage control system 15 is securely maintained at a desired value even upon deceleration of the motor 5. Accordingly, the driving of the inverter main circuit 4 can be continued stably until the motor 5 completely stops.

As explained above, according to the inverter device of the first embodiment, during a period when instantaneous power cut or an instantaneous voltage drop occurs in the system power supply, the current command to be output to the current control unit is generated based on the information on the voltage of the smoothing capacitor and the output command to be output to the inverter main circuit. Hence, even if an instantaneous voltage drop occurs in the system power supply, driving of the load can be continued securely.

Second Embodiment.

Figure 4:
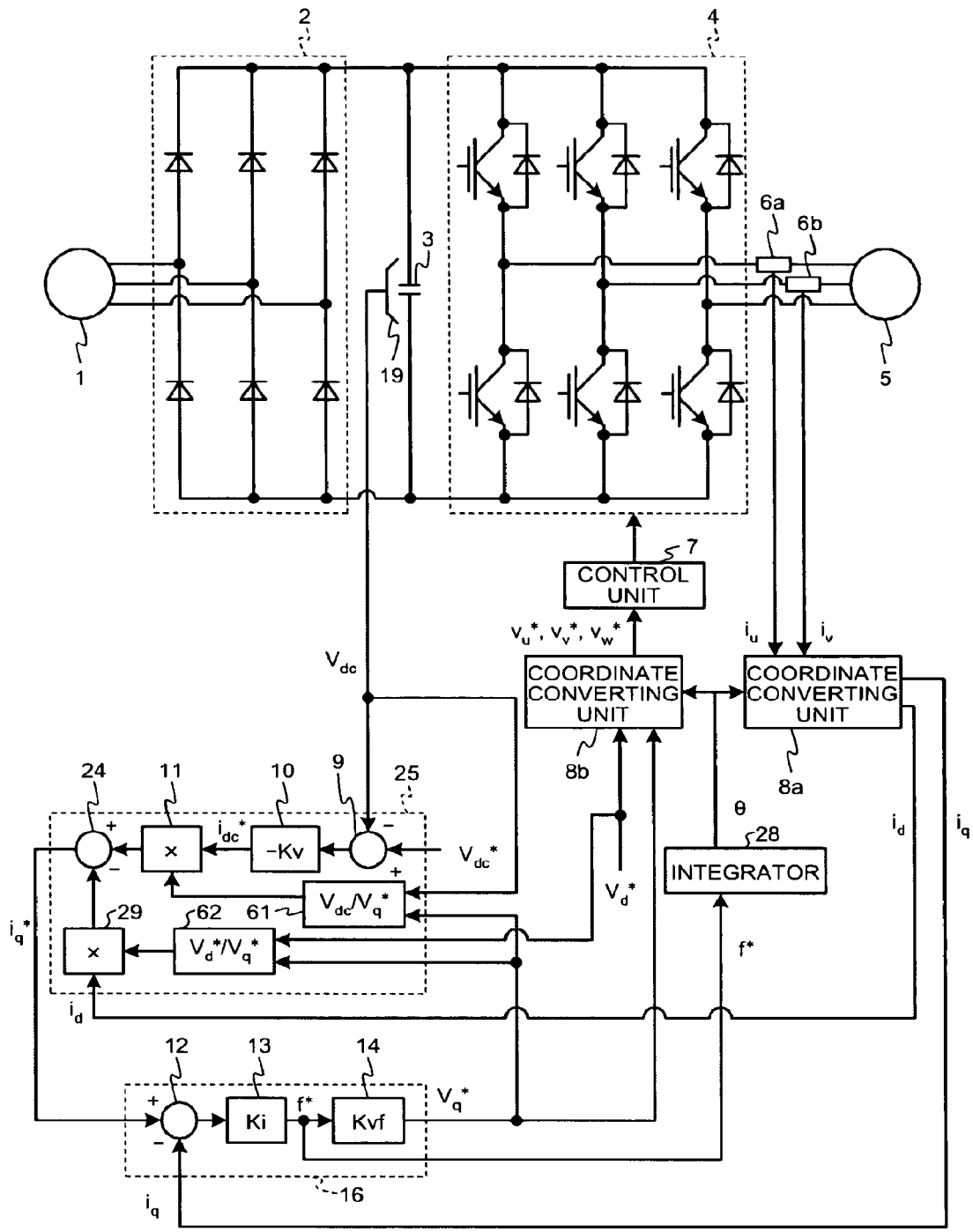
FIG. 4 is a schematic diagram of an inverter device according to a second embodiment of the present invention.

FIG. 4 is a schematic diagram of an inverter device according to a second embodiment of the present invention. In the inverter device according to the first embodiment shown in FIG. 1, the control command to be output to the inverter main circuit 4 is calculated with the condition that $V_d^*=0$. Meanwhile, in the inverter device according to the second embodiment, the control command to be output to the inverter main circuit 4 is calculated with the condition that $V_d^* \neq 0$. More specifically, a voltage control system 25 is employed in the inverter device instead of the voltage control system 15 shown in FIG. 1. The voltage control system 25 includes, in addition to the components of the voltage control system 15, an operator 62 that performs an arithmetic operation to obtain "$V_d^*/V_q^*$" by using the d-axis voltage command $V_d^*$ (set value) and the q-axis voltage command $V_q^*$, a multiplier 29 that multiplies the output of the operator 62 with the d-axis current $i_d$, and a subtractor 24 that subtracts the output of the multiplier 29 from the output of the multiplier 11. Because other constituents are same as or equivalent to those of the first embodiment shown in FIG. 1, the same reference numerals are given to the constituents corresponding to those of the first embodiment and detailed explanation thereof is omitted below.

Figure 5:
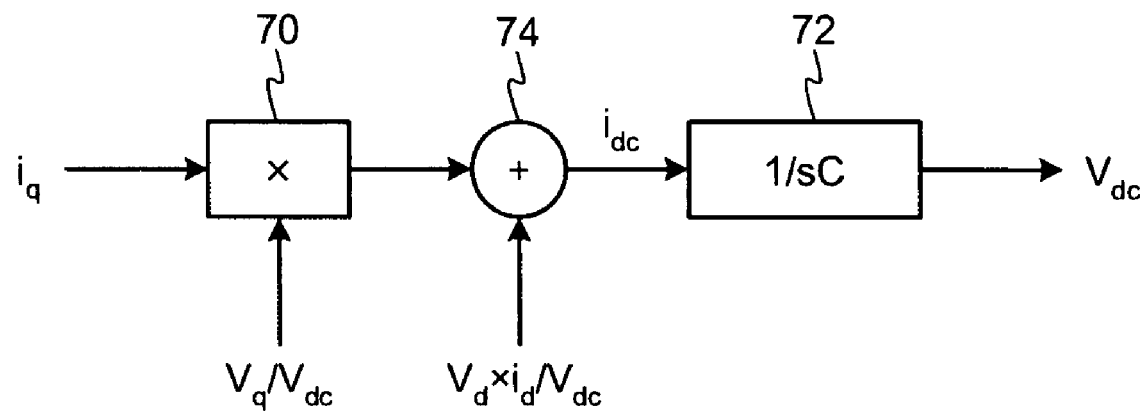
FIG. 5 is a schematic diagram of a basic configuration for determining a voltage control system according to the second embodiment.

Subsequently, the configuration and the operations of the voltage control system 25 of the inverter device shown in FIG. 4 are explained below with reference to FIG. 5. FIG. 5 is a schematic diagram of the basic configuration for determining the configuration of the voltage control system according to the second embodiment.

In the second embodiment, the energy (electric power) output from the smoothing capacitor 3 is "$V_{dc} \times i_{dc}$" as in the case of the first embodiment. Moreover, the energy of the inverter output (electric power) is "$V_d \times i_d + V_q \times i_q$", which is also same as in the case of the first embodiment. However, in the second embodiment, because control is performed under the condition that $V_d^* \neq 0$, the term $V_d$ remains so that the following equation represents the relation between $i_{dc}$ and $i_q$:

$$i_{dc} = (i_q \times V_q + i_d \times V_d)/V_{dc} = i_q \times V_q/V_{dc} + V_d \times i_d/V_{dc} \qquad (2)$$

The control system shown in FIG. 5 represents Equation (2). The multiplier 70 multiplies $i_q$ with the coefficient "$V_q/V_{dc}$", and an adder 74 adds "$V_d \times i_d/V_{dc}$" to the result of multiplication obtained in the multiplier 70 thereby obtaining $i_{dc}$. Because the smoothing capacitor with the capacitance C is charged with $i_{dc}$, $V_{dc}$ is obtained.

An output of a typical voltage controller is $i_{dc}^*$ (for example, see the voltage controller 10 of the voltage control system 15 shown in FIG. 1). In current controllers, however, it is preferable that * the q-axis current component $i_q$ that directly relates to the amount of torque be controlled. This aspect is same as in the case of the first embodiment. In the second embodiment, meanwhile, as shown in FIG. 4, there are provided in the voltage control system 25 the operator 61 that performs an arithmetic operation to obtain "$V_{dc}/V_q^*$", the multiplier 11 that multiplies the output of the operator 61 with "$i_{dc}^*$", the operator 62 that performs an arithmetic operation to obtain "$V_d^*/V_q^*$", the multiplier 29 that multiplies the output of the operator 62 with "$i_d$", and the subtractor 24 that subtracts the output of the multiplier 29 from the output of the multiplier 11. In this manner, the voltage control system 25 is configured to output the q-axis current command $i_q$ to the current control system 16.

In other words, because Equation (2) can be changed to:

$$i_q = i_{dc} \times V_{dc}/V_q - i_d \times V_d/V_q \qquad (3),$$

the q-axis current control $i_q^*$ can be output to the current control system 16 by configuring the voltage control system 25 shown in FIG. 4.

As described above, in the second embodiment, the q-axis current command $i_q^*$ that is required by the current control system is obtained, when both of the d-axis voltage command $V_d$ and the q-axis voltage command $V_q$ are given, in a way that certain multiplying, adding, and subtracting processing are performed on the current command $i_{dc}^*$ to be output to the smoothing capacitor. Because of such a processing, the current $i_{dc}$ of the smoothing capacitor that is required by the voltage control system is obtained securely to obtain $V_{dc}$ that is stable at a desired value. Hence, even if an instantaneous voltage drop occurs in the system power supply, the driving of the inverter device can be continued stably.

As described above, in the second embiodiment, the q-axis current command $i_q^*$ that is required by the current control system is obtained, when both of the d-axis voltage command $V_d^*$ and the q-axis voltage command $V_q^*$ are given, in a way that certain multiplying, adding, and subtracting processing are performed on the current command $i_{dc}^*$ to be output to the smoothing capacitor. Because of such a processing, the current $i_{dc}$ of the smoothing capacitor that is required by the voltage control system is obtained securely to obtain $V_{dc}$ that is stable at a desired value. Hence, even if an instantaneous voltage drop occurs in the system power supply, the driving of the inverter device can be continued stably.

Furthermore, in the second embodiment, because each of the d-axis voltage command $V_d^*$ and the q-axis voltage command $V_q^*$ can be independently given, each of the exciting state and the torque output of the motor can be individually controlled. In this manner, the drive performance of the motor 5 in the normal drive mode can be improved as well.

The above characteristics can be clarified by comparing the configuration of the voltage control system 15 according to the first embodiment to the voltage control system 25 according to the second embodiment.

For example, the voltage control system 15 according to the first embodiment shown in FIG. 1 does not include the structure (components equivalent to the subtractor 24, the multiplier 29, and the operator 62 shown in FIG. 4) that cancels the second term $(-i_d \times V_d/V_q)$ of Equation (3). Accordingly, the command value (the q-axis current command $i_q^*$) of $i_q$ that is originally necessary cannot be output to the current control system 16 from the voltage control system 15. Especially, in the voltage control system 15 according to the first embodiment, $i_{dc}^*$ is controlled at almost zero in a state where the voltage $V_{dc}$ across the terminals of the smoothing capacitor 3 is stable. Accordingly, the output of the voltage control system 15 becomes zero, resulting in that a large influence of the term "$-i_d \times V_d$" is left.

On the oth hand, the voltage control system 25 according to the second embodiment shown in FIG. 4 includes the structure including the subtractor 24, the multiplier 29, and the operator 62 for canceling the second term $(-i_d \times V_d/V_q)$ of Equation (3). Hence, a desired command value (the q-axis current command $i_q^*$) can be output to the current control system 16 from the voltage control system 25, whereby the inverter input current is easy to meet a controller output of the direct-current-bus voltage.

As explained above, according to the inverter device of the second embodiment, during a period when instantaneous power cut or an instantaneous voltage drop occurs in the system power supply, the current command to be output to the current control unit is generated based on the information on the voltage of the smoothing capacitor, the output command to be output to the inverter main circuit, and the output currents of the inverter main circuit. Accordingly, in addition to the effects achieved in the first embodiment, the drive performance of the load in the normal drive can be improved.

Third Embodiment

Figures 1, 6:
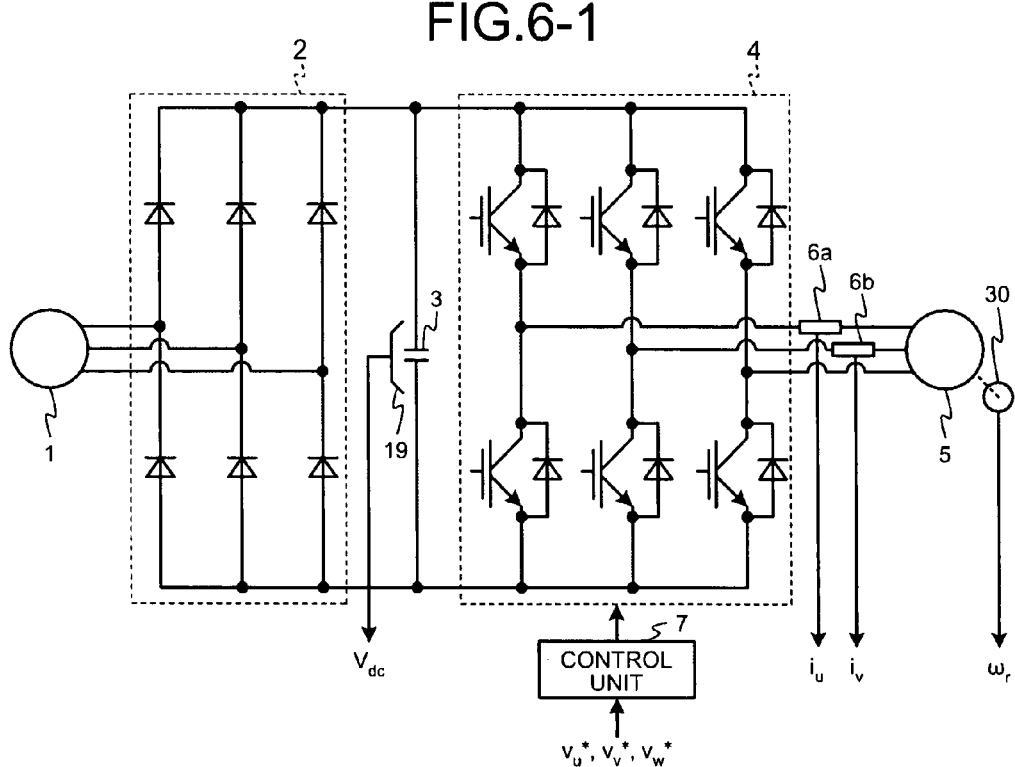
Figures 2, 6:
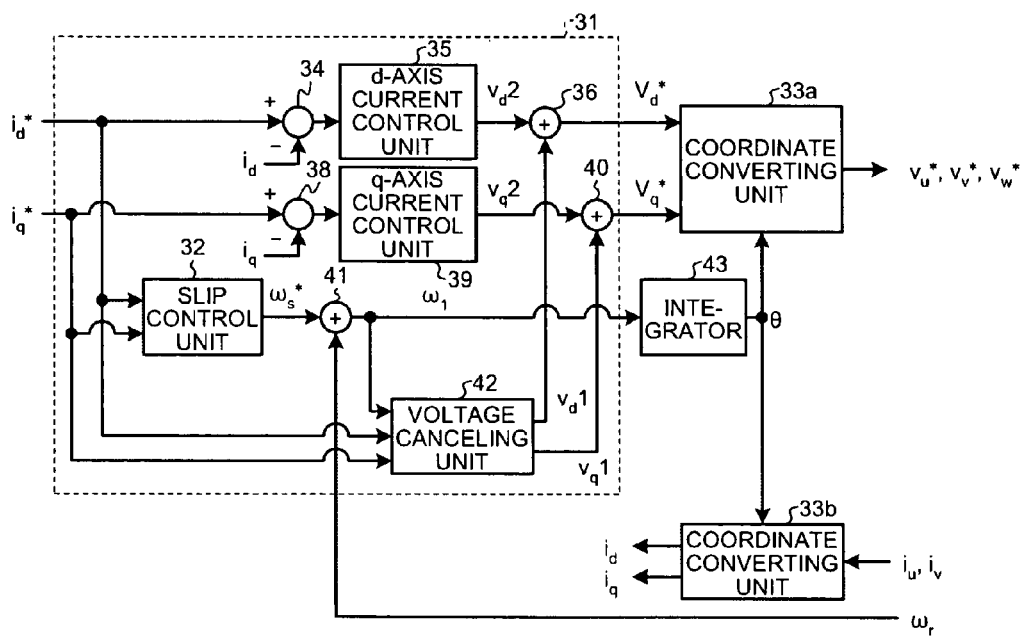
Figures 3, 6:
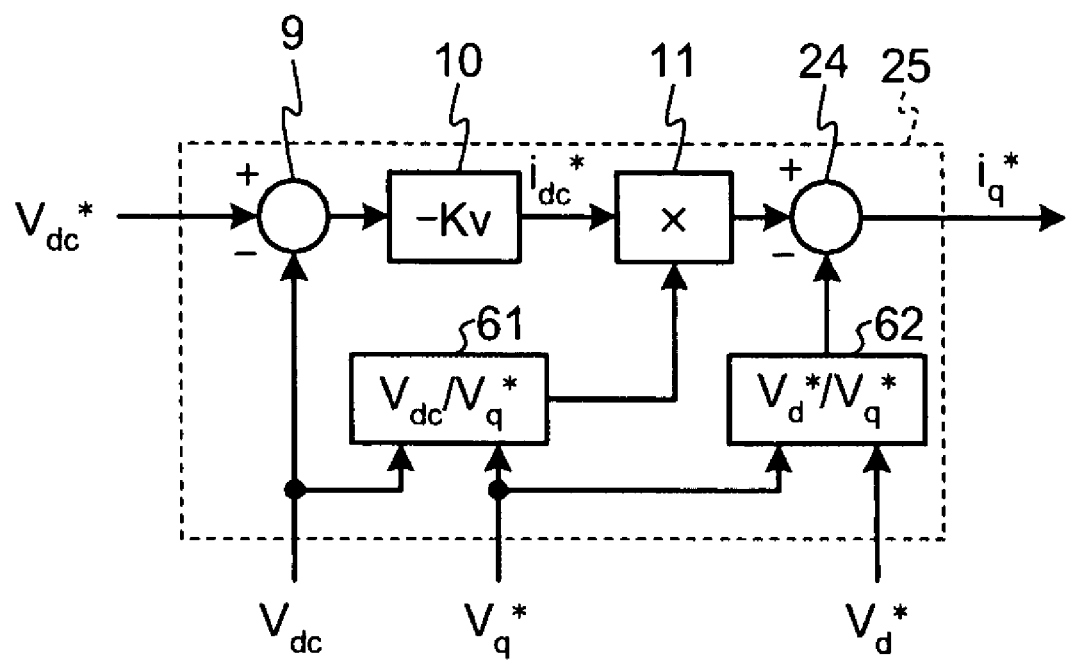

FIGS. 6-1, 6-2, and 6-3 are schematic diagrams of the configuration of an inverter device according to the third embodiment of the present invention. More specifically, FIG. 6-1 is a schematic diagram of the configuration of a driving unit, which includes an inverter main circuit, of an inverter device according to a third embodiment. FIG. 6-2 is a schematic diagram of the configuration of a relevant part of a feedback control system of the inverter device according to the third embodiment. FIG. 6-3 is a schematic diagram of the configuration of a voltage control system that constitutes a part of the feedback control system of the inverter device according to the third embodiment.

The driving unit of the inverter device according to the third embodiment shown in FIG. 6-1 includes a rotation speed detector 30 that detects the rotation speed of the motor 5 serving as a load. The speed detected by the rotation speed detector 30 is input to the feedback control system shown in FIG. 6-2. Moreover, the output of the voltage control system 25 shown in FIG. 6-3 is also input to the feedback control system shown in FIG. 6-2. The configuration shown in FIG. 6-1 other than the rotation speed detector 30 is same as or equivalent to that of each of the first and second embodiments shown in FIGS. 1 and 4. Moreover, the configuration of the voltage control system shown in FIG. 6-3 is same as or equivalent to that of the voltage control system according to the second embodiment shown in FIG. 4. Therefore, the same reference numerals as those shown FIGS. 1 and 4 are given to the constituents that are same as or equivalent to those shown in FIGS. 1 and 4, and detailed explanation thereof is omitted below.

Meanwhile, the feedback control system of the inverter device according to the third embodiment shown in FIG. 6-2 includes a current control system 31, a coordinate converting unit 33b, a coordinate converting unit 33a, and an integrator 43. To the current control system 31 are input the rotation speed $\omega_r$ of the motor 5 that is detected by the rotation speed detector 30, currents $i_u$ and $i_v$ detected by the current detectors 6a and 6b, and a voltage $V_{dc}$ across the terminals of the smoothing capacitor 3 that is detected by the voltage detector 19. The coordinate converting unit 33b converts a detected value in the UVW three-phase fixed coordinate system to a detected value in the orthogonal dp-double-axis rotating coordinate system, and outputs the result to the current control system 31. The coordinate converting unit 33a generates inverter output-voltage commands $(v_u^*, v_v^*, v_w^*)$ obtained by performing coordinate conversion on the output (the q-axis voltage command $V_q^*$, d-axis voltage command $V_d^*$) of the current control system 31. The integrator 43 outputs information on the reference phase to the coordinate converting units 33a and 33b. The current control system 31 includes a slip control unit 32; subtractors 34 and 38; a d-axis current control unit 35; a q-axis current control unit 39; adders 36, 40, and 41; and a voltage canceling unit 42.

The operations of the inverter device according to the third embodiment are explained with reference to FIGS. 6-1 to 6-3.

First, to the current control system 31, is input each of the q-axis current command $i_q^*$ that is given as a certain command value when the power supply is in a normal state, and that is input from the voltage control system 25 when an instantaneous voltage drop occurs in the power supply, the d-axis current command $i_d^*$ that is a set value, the rotation speed $\omega_r$ of the motor 5 that is detected by the rotation speed detector 30, and the d-axis current $i_d$ and the q-axis current $i_q$ that are converted by the coordinate converting unit 33b. The current control system 31 generates an output frequency $\omega_1$ to be input to the inverter main circuit 4 from the q-axis current command $i_q^*$, the d-axis current command $i_d^*$, and the rotation speed $\omega_r$ that are input to the current control system 31, and outputs the generated output frequency $\omega_1$ to the integrator 43. Moreover, the current control system 31 generates the q-axis voltage command $V_q^*$ and the d-axis voltage command $V_d^*$ from the q-axis current command $i_q^*$, the d-axis current command $i_d^*$ the d-axis current $i_d$, and the q-axis current $i_q$ that are input to the current control system 31. The current control system 31 outputs the q-axis voltage command $V_q^*$ and the d-axis voltage command $V_d^*$ to the coordinate converting unit 33a.

The coordinate converting unit 33b performs an arithmetic operation to obtain the d-axis current component $i_d$ and the q-axis current component $i_q$ based on the currents ($i_u$, $i_v$) detected by the current detectors 6a and 6b and the output (reference phase θ) of the integrator 43, and outputs the d-axis current component $i_d$ and q-axis current component $i_g$ to the current control system 31. The coordinate converting unit 33a generates the inverter output-voltage commands $V_u^* V_v^*$ and $V_w^*$ from the control output (the d-axis voltage command $V_d^*$ and q-axis voltage command $V_g^*$) of the current control system 31, while taking the reference phase θ output from the integrator 43 into consideration. The coordinate converting unit 33a outputs the inverter output-voltage commands $V_u^*$ $V_v^*$ and $V_w^*$ to the control unit 7 (see FIGS. 1 and 4). Because the control processing performed inside the current control system 31 is well known, detailed explanation thereof is omitted here.

When the control processing of the inverter device according to the third embodiment is compared with that of the second embodiment, they have difference as explained below. First of all, the control processing according to the third embodiment is different from those of the first and second embodiments in that each of the d-axis current control unit 35 and the q-axis current control unit 39 performs feedback control on each current based on each of the d-axis current command $i_d^*$ and the q-axis current command $i_q^*$. The further difference is that the reference phase θ used for coordinate conversion varies depending on the rotation speed $\omega_r$ (in other words, the output frequency of the inverter main circuit 4) of the motor (the reference phase θ is arbitrary according to the first and second embodiments).

However, because the above Equation (2) is satisfied even in a control system that controls an inverter device by use of a rotation speed detected by the rotation speed detector 30 as in the case of the third embodiment, the voltage control system 25 explained in the second embodiment can be used. In other words, by substituting the output of the voltage control system 25 explained in the second embodiment for the q-axis current command $i_q^*$ to be input to the current control system 31 shown in FIG. 6-2, the voltage $V_{dc}$ of the smoothing capacitor 3 can be controlled at a desired value during a period when an instantaneous voltage drop occurs.

As described above, in the control system in which feedback control is performed on each of the d-axis current and the q-axis current individually based on the number of rotations of the motor (or the rotation speed of the motor), the q-axis voltage command $i_q^*$ to be output to the current control system is obtained, when both of the d-axis voltage command $V_d^*$ and the q-axis voltage command $V_q^*$ of the inverter output are given, in a way that the certain multiplying, adding, and subtracting processing are performed on the current command $i_{dc}^*$ to be output to the smoothing capacitor 3. Accordingly, a current $i_{dc}$ of the smoothing capacitor that is required by the voltage control system is securely obtained to obtain $V_{dc}$ that is stable at a certain value. Hence, even if an instantaneous voltage drop occurs in the system power supply, the driving of the inverter device can be continued stably.

If the rotation speed of the motor 5 decreases due to the load connected to the motor 5 when such control is performed, the inverter main circuit 4 is controlled such that the voltage of the smoothing capacitor 3 is maintained at a certain value. As a result, the number of rotations of the motor 5 and the output frequency of the inverter main circuit 4 are controlled so that the number of rotations and the output frequency of the motor 5 are maintained almost uniform. Along with the deceleration of the motor 5, the output frequency and the output voltages $V_q$ and $V_d$ of the inverter main circuit 4 decrease. However, because the multiplier 11 and the subtractor 24 of the voltage control system 25 take the terms $V_d$ and $V_q$ into account, the response of the voltage control system 25 is securely maintained at a desired value even upon the deceleration. Accordingly, the driving of the inverter main circuit 4 can be continued stably until the motor 5 completely stops.

In addition, because the frequency command of the inverter output is calculated based on the number of rotations of the motor and the slip frequency, the q-axis current can be securely reflected as the torque of the motor. Accordingly, the voltage of the smoothing capacitor can be controlled more stably.

In the third embodiment the voltage control system 25 shown in FIG. 4 is used as a voltage control system that constitutes a part of a feedback control system. Alternatively, the voltage control system 15 shown in FIG. 1 can be used to achieve the same effect as that of the first embodiment.

Moreover, in the third embodiment, the motor 5 is assumed to be a motor (for example, an induction motor) that requires the slip control unit 32. Alternatively, other motors (for example, a synchronous motor) can be employed. When a synchronous motor, or the like, is employed, the slip control unit 32 of the current control system 31 shown in FIG. 6-2 is not required. When the slip control unit 32 is not provided, the value detected by the rotation speed detector 30 is input to the voltage canceling unit 42 and the integrator 43.

Each of the inverter devices according to the first to the third embodiments is described as one including a three-phase converter that is configured to be connected to a three-phase alternating-current power supply and to rectify a three-phase alternating-current voltage supplied thereto. However, the inverter device can be connected to an alternating-current power supply other than a three-phase alternating-current power supply. In such a case, it suffices that a preferable converter be used depending on the type of the alternating-current power supply.

According to the first to the third embodiments, the configuration is described in which the motor 5 that requires a three-phase alternating-current output is connected as a load. Alternatively, a load that requires an alternating-current output other than a three-phase alternating-current output can be connected. In such a case, as well, it suffices that a preferable inverter main circuit be used depending on the type of the load.

INDUSTRIAL APPLICABILITY

As descried above, the inverter device according to the present invention is useful as an inverter device capable of continuing to drive a load securely under the circumstance when an instantaneous voltage drop occurs in a power supply.

The invention claimed is:
1. An inverter device comprising:
a converter circuit that rectifies a first alternating current output from a power supply to generate a rectified current;
a capacitor that stores therein the rectified current and outputs a direct current based on the rectified current;

an inverter circuit that converts the direct current into a second alternating current for driving a load;

a voltage control unit that, during a period when any one of an instantaneous power cut and an instantaneous voltage drop occurs in the power supply, generates and outputs a first current command based on a voltage of the capacitor and a q-axis voltage command; and a current control unit that generates and outputs, based on the first current command, the q-axis voltage command for controlling the inverter circuit to output the second alternating current, wherein the voltage control unit generates the first current command $i_q^*$:

$$i_q^* = i_{dc}^* \times V_{dc}/V_q^*$$

where $V_{dc}$ is the voltage of the capacitor, $V_q^*$ is the q-axis voltage command, and $i_{dc}^*$ is a current that should flow in the capacitor.

2. The inverter device according to claim 1, wherein the first current command is a command value for a current obtained by performing coordinate conversion on the second alternating current by use of a reference phase that varies depending on the second alternating current.

3. An inverter device comprising:

a converter circuit that rectifies a first alternating current output from a power supply to generate a rectified current;

a capacitor that stores therein the rectified current and outputs a direct current based on the rectified current;

an inverter circuit that converts the direct current into a second alternating current for driving a load;

a voltage control unit that, during a period when any one of an instantaneous power cut and an instantaneous voltage drop occurs in the power supply, generates and outputs a first current command based on a voltage of the capacitor, a q-axis voltage command, and the d-axis current; and a current control unit that generates and outputs, based on the first current command, the q-axis voltage command for controlling the inverter circuit to output the second alternating current, wherein the voltage control unit generates the first current command $i_q^*$:

$$i_q^* = (i_{dc}^* \times (V_{dc}/V_q^*)) - (i_d \times (V_d^*/V_q^*))$$

where $V_{dc}$ is the voltage of the capacitor, $V_q^*$ is the q-axis voltage command, $i_{dc}^*$ is a current that should flow in the capacitor, $i_d$ is the d-axis current, and $V_d^*$ is a predefined voltage.

4. The inverter device according to claim 3, wherein the first current command is a command value for a current obtained by performing coordinate conversion on the second alternating current by use of a reference phase that varies depending on the second alternating current.

* * * * *